United States Patent
Rodrigues-Morgado et al.

(10) Patent No.: US 9,694,477 B2
(45) Date of Patent: Jul. 4, 2017

(54) REMOTE-PIVOTING METHOD AND TOOL FOR IMPLEMENTING SAME

(75) Inventors: Cédric Rodrigues-Morgado, Toulouse (FR); Jean-Marc Heral, Bruiguieres (FR)

(73) Assignees: Airbus SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 225 days.

(21) Appl. No.: 13/819,752

(22) PCT Filed: Aug. 30, 2011

(86) PCT No.: PCT/FR2011/051981
§ 371 (c)(1),
(2), (4) Date: Feb. 28, 2013

(87) PCT Pub. No.: WO2012/028815
PCT Pub. Date: Mar. 8, 2012

(65) Prior Publication Data
US 2013/0161579 A1 Jun. 27, 2013

(30) Foreign Application Priority Data
Aug. 31, 2010 (FR) ...................................... 10 56891

(51) Int. Cl.
| | |
|---|---|
| *B66F 15/00* | (2006.01) |
| *B25B 9/00* | (2006.01) |
| *B64C 25/26* | (2006.01) |
| *B64F 5/60* | (2017.01) |

(52) U.S. Cl.
CPC ................ *B25B 9/00* (2013.01); *B64C 25/26* (2013.01); *B64F 5/60* (2017.01); *B66F 15/00* (2013.01)

(58) Field of Classification Search
None
See application file for complete search history.

(56) References Cited

U.S. PATENT DOCUMENTS

| | | | | |
|---|---|---|---|---|
| 1,630,013 A | * | 5/1927 | Hyatt ........................ | B25B 7/00 294/11 |
| 2,029,532 A | * | 2/1936 | Karcher ........................ | 403/114 |
| 2,279,809 A | * | 4/1942 | Apfel ........................ | F23J 1/04 294/104 |
| 2,559,421 A | * | 7/1951 | Garrett ........................ | 248/515 |
| 3,346,293 A | | 10/1967 | Wilcox | |

(Continued)

FOREIGN PATENT DOCUMENTS

FR        1273954 A    10/1961

OTHER PUBLICATIONS

English mach transl of FR 1273954 Oct. 20, 1961.*
(Continued)

*Primary Examiner* — Joseph J Hail
*Assistant Examiner* — Brian Keller
(74) *Attorney, Agent, or Firm* — Lorenz & Kopf, LLP

(57) ABSTRACT

A method and a tool for remotely pivoting an element mounted in a structure is provided. The method includes exerting a lever effect on the element by way of a control bearing on the structure coupled to a connection engaged with the element to cause it to pivot in a pivoting plane. The method also includes applying an angular offset to this connection in a plane different from the pivoting plane, in which the lever effect is produced, in order to render the control remotely operable.

11 Claims, 4 Drawing Sheets

(56) References Cited

U.S. PATENT DOCUMENTS

| | | | |
|---|---|---|---|
| 4,057,276 A | | 11/1977 | Currie |
| 4,374,600 A | | 2/1983 | van Zelm |
| 4,483,562 A | | 11/1984 | Schoolman |
| 5,354,110 A | * | 10/1994 | Licata ................... F24B 1/199 294/104 |
| 5,396,674 A | * | 3/1995 | Bolds .............................. 5/633 |
| 5,800,117 A | * | 9/1998 | Milton ................... B66C 23/48 254/4 R |
| 6,652,013 B1 | | 11/2003 | Peterson |
| 2007/0152457 A1 | * | 7/2007 | Hutchings ........... B25J 11/0025 294/105 |
| 2007/0197939 A1 | * | 8/2007 | Wallace et al. .............. 600/587 |

OTHER PUBLICATIONS

International Searching Authority, International Search Report dated Feb. 10, 2012 for International No. PCT/FR2011/051981.
International Searching Authority, Written Opinion of the International Searching Authority dated Feb. 10, 2012 for International Application No. PCT/FR2011/051981.

\* cited by examiner

REMOTE-PIVOTING METHOD AND TOOL FOR IMPLEMENTING SAME

CROSS-REFERENCE TO RELATED APPLICATIONS

This application is a U.S. National-Stage entry under 35 U.S.C. §371 based on International Application No. PCT/FR2011/051981, filed Aug. 30, 2011, which was published under PCT Article 21(2) and which claims priority to French Application No. 1056891, filed Aug. 31, 2010, which are each incorporated by reference herein in their entirety.

TECHNICAL FIELD

The technical field relates to a method for remotely pivoting an element and to a tool for implementing this method. The present disclosure applies most particularly when the element is situated in an environment where access is difficult.

Accordingly, in its main but not exclusive application, the present disclosure concerns pivoting an aircraft landing gear retaining hook into a locking position. The landing gear of an aircraft in flight is conventionally locked in a folded position in its bay by a gear retaining hook known as the body landing gear (BLG) hook.

In the event of a serious hydraulic or electrical problem with the aircraft, an emergency gear control operates the hook to unlock the gear, which can then be deployed for an emergency landing, for example by gravity. In order to test the reliability of this control on an assembly line or in service, the hook is locked manually beforehand with the landing gear deployed.

BACKGROUND

Until now, such manual locking has been effected by an operative on site. The distance between the strut of the gear and the control for raising the gear is such that this intervention usually takes place in the gear bay. To allow the operative to reach the hook, it is necessary to provide a series of tools such as a safety harness, a reel of line to be fixed to the harness, and an anchorage in the bay for anchoring the reel. Once anchored, the line is pulled out from the reel to recover the clip and attach it to the safety harness worn by the operative, who can then climb onto the landing gear and pull himself up into the landing gear bay.

This operation entails safety risks, mobilizes two operatives and necessitates the assembly of a large number of elements, which also takes time and increases the risk of assembly errors.

SUMMARY

The present disclosure aims to circumvent these drawbacks by enabling remote locking without the operative having to climb onto the gear or into the gear bay. To this end, there is provision for pivoting the hook using lever means having a configuration adapted to the accessibility constraints.

To be more precise, the present disclosure provides a method for remotely pivoting an element mounted in a structure, including exerting a lever effect on the element by way of a control bearing on the structure coupled to a connection engaged with the element to cause it to pivot in a pivoting plane and in applying an angular offset to this connection in a plane different from the pivoting plane, in particular perpendicular to that plane, in which the lever effect is produced, in order to render the control remotely operable.

Such an offset advantageously enables the element that is to be caused to pivot to be reached remotely when congestion renders the element inaccessible by a direct route, when a rectilinear connection does not allow this and is therefore not usable. Thus in the case of the locking hook described above the presence of the landing gear renders remote access to the hook, i.e. in this case access from the ground, by any tool with a straight handle virtually impossible.

According to advantageous particular features, the method of the present disclosure provides for orienting the offset in accordance with multiple angles and/or rendering the connection telescopic to adapt the connection to a given remote access configuration or a particular application.

The present disclosure also relates to a tool for implementing this method. Such a tool includes a head provided with a lever arm, a first tubular rod section coupled to the head, a tubular elbow connecting the first section to a second tubular rod section, a control rod in mobile engagement with the second section and flexible means connecting the control rod to the lever arm via a guide connection fastened to the first section.

In accordance with certain embodiments: the lever arm may comprise a handle coupled to a central support mounted to rotate about an axis between two guide shoes of the support and the support and the shoes may advantageously be covered with a PTFE covering in order not to damage the element to be pivoted and the structure on which said element is mounted; the elbow is composed of two tubular parts, which may be of substantially equal length, these tubular parts forming between them a particular offset angle, each elbow part being fitted to each corresponding rod section with which it is connected by removable locking means; the rod sections and the elbow parts have openings on annular portions, these openings being superposed when the rod sections and the elbow parts are in their nominal position, and pins serving as removable locking means are introduced transversely via a set of diametrically opposite openings to lock the rod sections in accordance with an elbow angle, at least two sets of openings advantageously being provided on at least one elbow part and the corresponding rod section to vary the orientation of the offset angle and thus to adapt to the congestion of the environment; the elbow parts are articulated to each other about an axis by a nut-and-bolt connection that can be tightened to lock it in accordance with a particular offset angle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description of the present disclosure is merely exemplary in nature and is not intended to limit the present disclosure or the application and uses of the present disclosure. Furthermore, there is no intention to be bound by any theory presented in the preceding background of the present disclosure or the following detailed description of the present disclosure.

Figure 1:
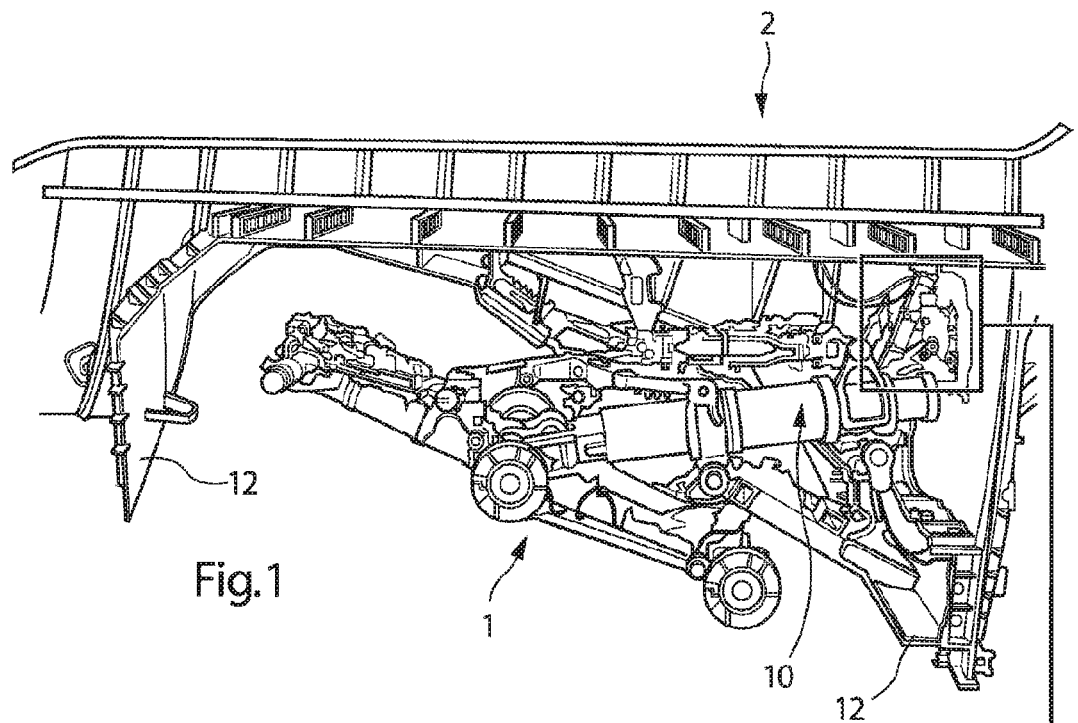
FIG. 1 and FIG. 1A, show a general view of a landing gear in its bay retained in position by a locking unit, the unit being enlarged in FIG. 1A.

Referring to the FIG. 1 general view, an aircraft landing gear 1 is represented in a position folded into its bay 2. A locking unit 3 maintains this folded position in the flight phase of the aircraft, in particular by hooking onto the main strut 10 of the gear 1. As can be seen more precisely in FIG. 1A, the unit 3 includes a hook 30 in a position locking a bar 11 carried by two arms 12 welded to the strut 10. The bar 11 is integrated into a housing 32 formed by the hook 30 in the closed locking position.

Figure 1A:
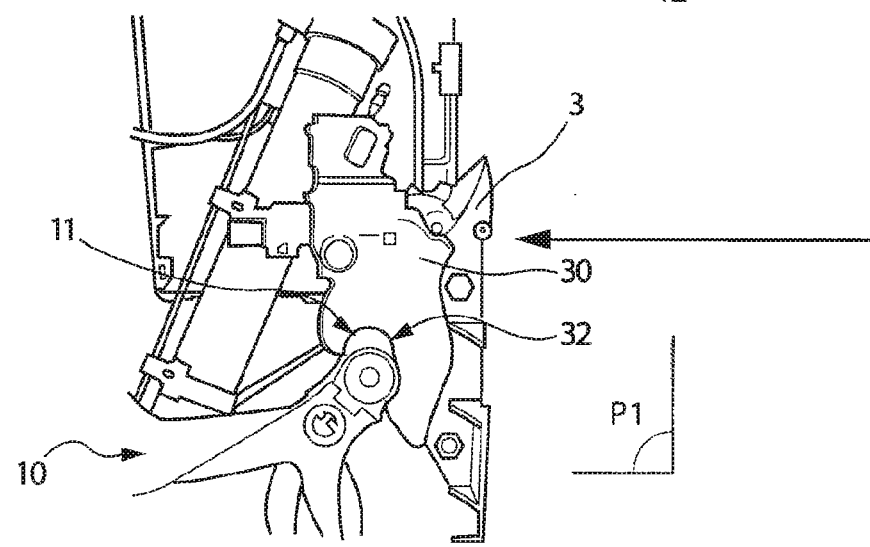

An electrical control (not represented) drives pivoting of the hook 30 in a pivoting plane P1 between two positions: the closed locking position illustrated by FIGS. 1 and 1A and an open position that allows release of the bar 11 and thus of the gear 1. In the event of an emergency landing, the hook 30 pivots into an open position and the doors 12 of the gear bay simultaneously open, the gear then being deployed into a landing position.

Figures 2, 3, 4:
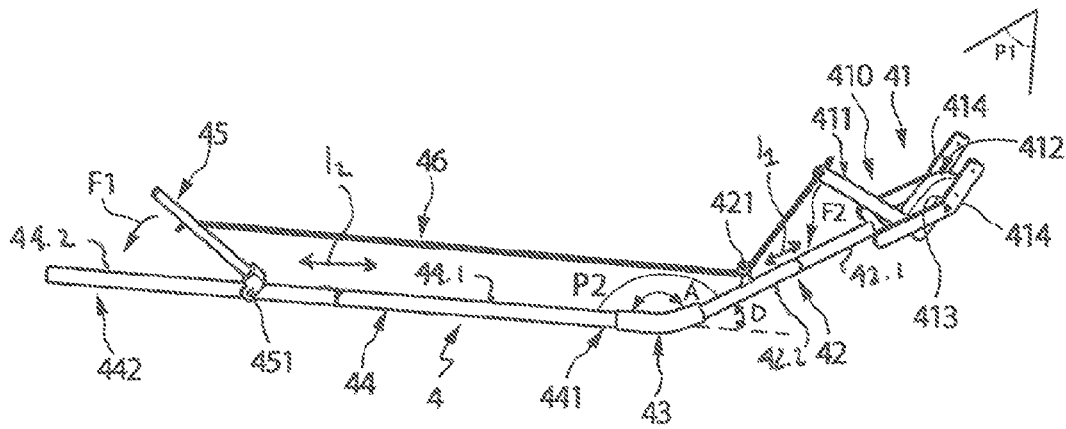
FIG. 2 shows, a general view of one example of a rod in accordance with the present disclosure.
FIG. 3 shows, a view of the head of the tool and the first rod section in accordance with FIG. 2.
FIG. 4 shows, a view of the elbow connecting the rod sections in accordance with FIG. 2.

In order to verify that the hook is able to open in an emergency to release the gear, the present disclosure provides for testing this control for opening the hook on the ground after manually closing the hook by means of a tool with a special structure enabling the operative to operate remotely. FIG. 2 shows the overall structure of such a tool 4. This tool includes a head 41 for connecting it to the locking unit and its hook, a first tubular rod section 42 fastened to the head 41 and mounted on an elbow 43 forming a particular elbow angle "A" in a plane P2, and a second tubular rod section 44 coupled at one end 441 to the elbow 43 and to which a control rod 45 is articulated about its axis 451 in the vicinity of the other end 442 of the second section. An offset D is formed between the rod sections 42 and 44, this offset D being an angle additional to the elbow angle A.

A control cord 46 connects the control rod 45 to a handle 411 of the head 41, passing via a guide pulley 421 fastened to the first section 42. When the control rod 45 is pulled by the operative in the direction of the arrow F1 about its axis 451, the handle 411 of the head is moved along a trajectory (arrow F2) in a plane P1 by the action of the cord 46, the plane P1 being substantially perpendicular to the plane P2 in the example show here.

FIG. 3 shows more precisely the head 41, to which the first section 42 is fixed directly. The head 41 is composed of a lever arm 410 that comprises a central support 412 and the handle 411 fixed to the support. This support 412 is mounted to rotate on a cylinder 413 connected at the ends to shoes 414 for guiding the support 412 in the locking unit 3 (see FIG. 6). The first rod section 42 is fastened to another cylinder 422 parallel to the cylinder 413 that also connects the two guide shoes 414. The shoes are advantageously covered with a PTFE covering. The lever arm 410 can thus pivot in the plane P1, which coincides with the plane of pivoting of the hook 30.

The support 412 is also covered with a PTFE covering in order not to damage the hook of the unit with which it will be engaged. When the operative pulls on the cord 46, the handle 411 and the support 412 turn about the tube 413 (arrow F2). A return spring 415 determines the force to be exerted on the cord 46 and returns them to the initial rest position when the operative ceases to pull on the cord.

FIG. 3 also shows the guide pulley 421 for guiding the cord 46 as far as the handle 411, this pulley being fastened to the first section 42, and a spring-loaded pin 431 disposed transversely in the section 42 to couple this first section 42 to the elbow 43, as illustrated by FIG. 4. In this FIG. 4, the elbow 43 connects the first section 42 to the second section 44 through introduction of the sections into each end 433 and 434 of the elbow 43, the inside diameter of the elbow and the outside diameters of the sections being adapted to enable a tight connection between these tubes. The connection may equally well be made by screw means or the like. In FIG. 4 the guide pulley 421 for guiding the cord 46 can also be seen.

The elbow 43 has a tubular shape that has been curved in the middle beforehand by bending or by welding in accordance with a predetermined obtuse elbow angle A, equal to about 164° in the example to produce about a 16° offset of the first section 42 extended along the same axis by the head 41 relative to the second section 44. This offset between the two sections is produced in a plane P2 substantially perpendicular to the plane P1 of pivoting of the lever arm 411 and the hook 30 (see FIG. 3).

In each of the two parts 435 and 436 of the elbow 43, as in the facing sections 42 and 44, a set of diametrically opposite openings 5 has been cut. Two spring-loaded pins 431 and 432 are introduced through these openings in order to secure the connections between the elbow 43 and the sections 42, 44 whilst remaining removable.

Another set of openings 5' is also provided in the rod section 42 in order to lock the assembly of the elbow 43 and the second section 44 by rotation about the first section (one opening 5' is represented as seen through the elbow as if it were transparent). The rotation is effected after the pin 431 has been removed and the elbow is locked by introducing this pin 431 into the openings 5'. The plane P2 of the elbow is then no longer substantially perpendicular to the pivoting plane P1.

Figure 5A:
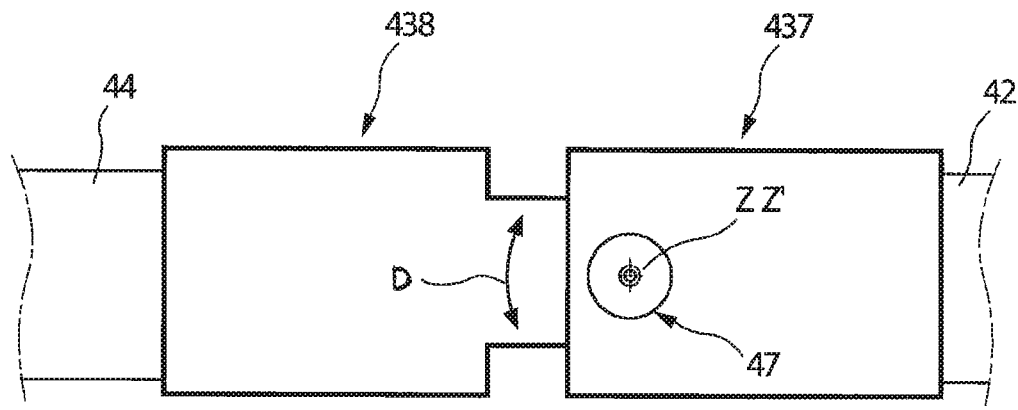
FIGS. 5A and 5B show, top and front views of an alternative version of the connecting elbow.
Figure 5B:
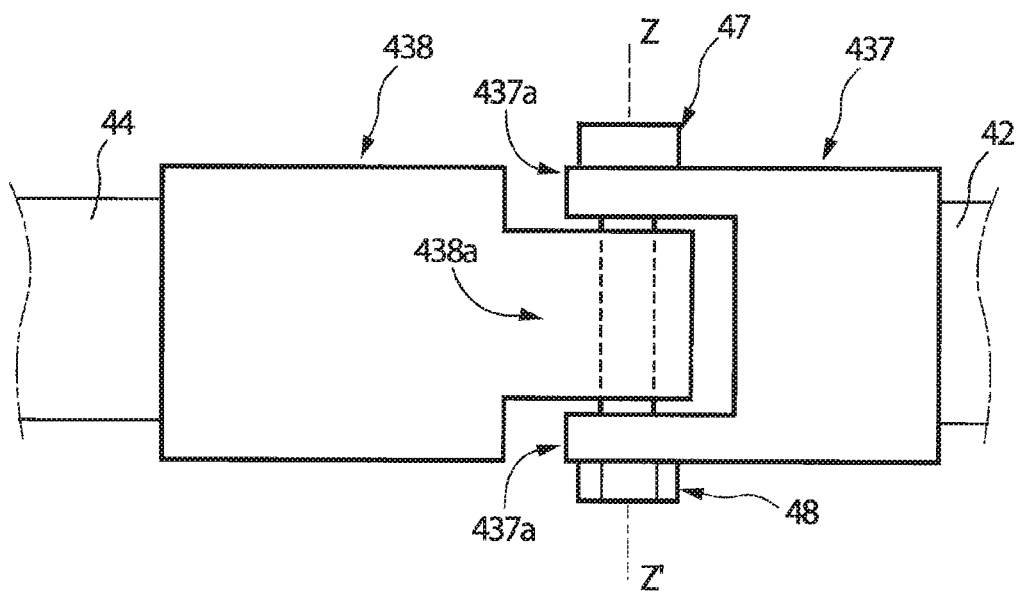

In an alternative version illustrated by the top and front views in FIGS. 5A and 5B, elbow parts 437 and 438 are articulated to each other about an axis Z'Z by a nut-and-bolt connection 47, 48. The rod sections 42 and 44 are screwed into the elbow parts 437 and 438. The angle A of the elbow is then made variable by rotation about the axis Z'Z and is locked in accordance with a particular offset by tightening the nut-and-bolt system. This tightening crushes the jaw formed by the advanced portions 437a of the elbow part 437 against the advanced portion 438a of the elbow part 438.

Figure 6:
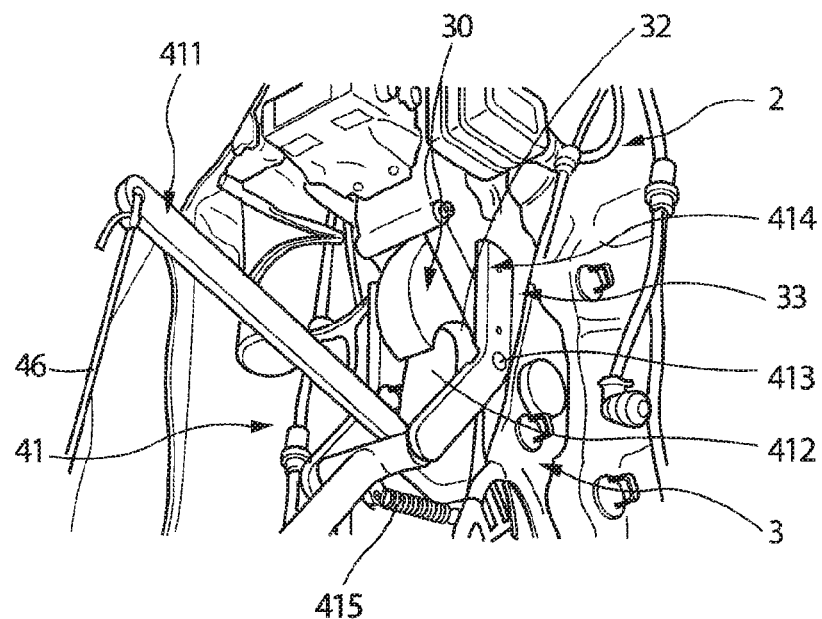
FIG. 6 shows, a view of the head and the first section engaged in the locking unit.

Referring to FIG. 6, showing partially the interior of a bay 2 without the gear, the central support 412 of the head 41 is conformed so that it can be integrated into the housing 32 formed by the hook 30 after guidance with the aid of the shoes 414 bearing on the walls 33 of the unit 3 without remaining locked in this housing. When the operative pulls on the cord 46, the support 412, engaged in the hook 30, turns about the cylinder 413. The hook 30, driven by the support 412, pivots toward the closed position. The tool can then be disengaged from the hook 30.

Figure 7:
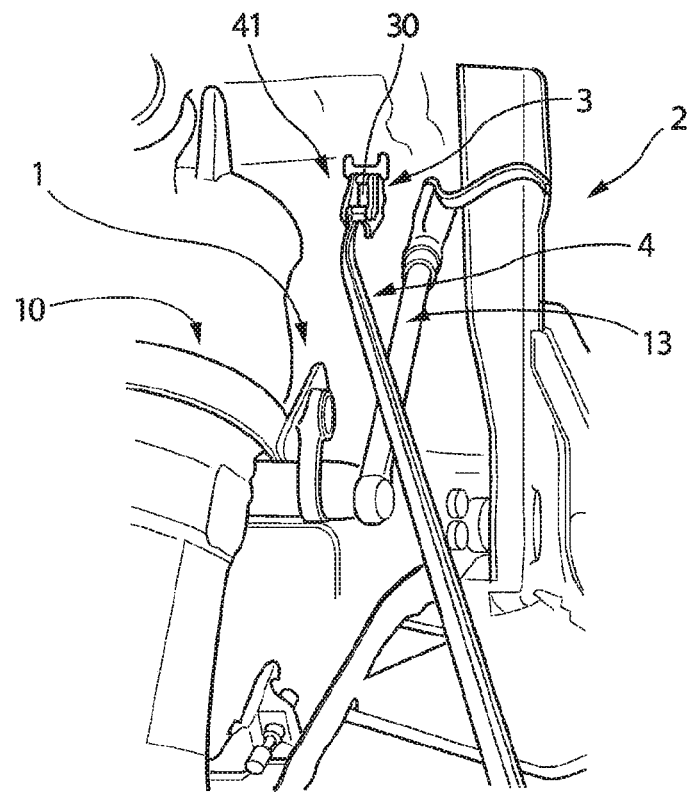
FIG. 7 shows, an interior view of the landing gear bay with a hook and a rod in accordance with the present disclosure installed to pivot the hook into the closed position.

FIG. 7 is an interior view of the bay 2 of the landing gear 1 equipped with the hook 30, showing better the effect produced by the offsetting of the tool 4 in accordance with the present disclosure. In this figure, the tool 4 is installed in the unit 3 to allow pivoting of the hook 30. FIG. 6 shows clearly that the relative positions of the strut 10 and the control 13 for raising the gear 1 prevent the unit 3 being reached directly i.e. in a rectilinear manner from outside the bay 2. The offset on the tool 4 allows the head 41 to be integrated without difficulty with the locking unit 3 and the hook 30.

The present disclosure is not limited to the embodiments described and represented. Accordingly, at least one of the rod sections may have sliding telescopic portions 42.1, 42.2, 44.1, 44.2 for adjusting the length of the tool to a particular length indicated at arrows $l_1$, $l_2$.

Furthermore, the elbow parts may be articulated to each other by a ball-joint connection that can be locked by jaws in any predetermined orientation within a given solid angle.

Furthermore, the elbow may have two or more than two bends of varied shape (from dihedral to continuously curved). A plurality of elbows may be provided, for example a second elbow orientable in a variable plane by any rotation mechanism (screw, bearings, etc.) of one of the parts of the second elbow in a rod section and locking of this rotation by any means (pushbutton, hook, etc.) in order to allow an orientation better suited to a given access configuration. The rotation mechanism and the locking means of that mechanism may alternatively equip the first part 435 of the elbow 43.

Furthermore, the cord may be replaced by any equivalent means: links, bands, blades, etc. The rod sections may be of oblong or rectangular section instead of tubular.

Furthermore, the present disclosure applies to any context in which, for reasons of difficult access that may be linked to safety conditions, it is advantageous to operate remotely, for example for construction work high above the ground, or more generally in the field of civil engineering. The support of the head of the tool of the present disclosure is matched to the element to be tilted or pivoted, which element may be a lever, a tie-rod, a nut, etc.

While at least one exemplary embodiment has been presented in the foregoing detailed description of the present disclosure, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure, it being understood that various changes may be made in the function and arrangement of elements described in an exemplary embodiment without departing from the scope of the present disclosure as set forth in the appended claims and their legal equivalents.

The invention claimed is:

1. A pivoting tool for remotely manipulating a pivot element, comprising:
  a head including two guide shoes, a cross-member interconnecting the two guide shoes at a first end thereof, a cylinder extending between the two guide shoes in a parallel and spaced apart relationship with the cross-member, a lever arm comprising a handle coupled to a handle end of a central support which is mounted to rotate on the cylinder such that the lever arm is rotatable in a pivoting plane, and a return spring operably coupled to the lever arm for biasing the central support into an initial rest position between the guide shoes, wherein the guide shoes extend from the cylinder beyond an end of the central support opposite from the handle end and terminate at a second end opposite the first end to define a guide slot therebetween;
  a first rod section coupled to the cross-member;
  an elbow that connects the first rod section to a second rod section and forms an offset angle between the first rod section and second rod section in a plane substantially perpendicular to the pivoting plane;
  a control rod in mobile engagement with the second rod section; and
  a flexible connection connecting the control rod to the lever arm via a guide connection fastened to the first rod section and operable to pivot the opposite end of the central support from the initial rest position in the guide slot to an operative position out of the guide slot for manipulating the pivot element.

2. The pivoting tool of claim 1, wherein the central support is covered with a PTFE covering in order not to damage an element to be pivoted.

3. The pivoting tool claimed in claim 1, wherein the elbow comprises two tubular parts of substantially equal length, the tubular parts forming the offset angle therebetween, each tubular part being fitted to each corresponding first rod section and second rod section to which it is connected by a removable locking element.

4. The pivoting tool of claim 3, wherein the first rod section and second rod section and the corresponding tubular parts have openings on annular portions, these openings being superposed when the first rod section and second rod section and the tubular parts are in the nominal connection position, and pins serving as removable locking element being introduced transversely through a set of openings to lock the first rod section and second rod section in accordance with an elbow angle.

5. The pivoting tool of claim 4, wherein at least two sets of openings are provided on at least one of the tubular parts and the corresponding one of the first rod section and second rod section to vary the orientation of the offset angle between the first rod section and the second rod section.

6. The pivoting tool of claim 1, wherein the the elbow articulates the first rod section relative to the second rod section about an axis of a nut-and-bolt connection to vary the offset angle and to lock a particular offset angle by tightening the nut-and-bolt connection.

7. The pivoting tool of claim 1, wherein the pivoting tool is utilized in conjunction with a locking unit including a pivoting Body Landing Gear (BLG) hook, wherein the head of the pivoting tool is sized and shaped to matingly engage the locking unit, and wherein the control rod is movable to cause pivoting movement of the lever arm in substantially the same plane as the pivoting BLG hook pivots when the head matingly engages the locking unit.

8. The pivoting tool of claim 1, wherein at least one of the first rod section and the second rod section comprises a sliding telescopic portion for adjusting a length thereof.

9. A method for remotely pivoting a locking element mounted in a structure comprising:
  providing a pivoting tool having a head including two guide shoes, a cross-member interconnecting the two guide shoes at a first end thereof, a cylinder extending between the two guide shoes in a parallel and spaced apart relationship with the cross-member, a lever arm comprising a handle coupled to a handle end of a central support which is mounted to rotate on the cylinder such that the lever arm is rotatable in a pivoting plane, and a return spring operably coupled to the lever arm for biasing the central support into an initial rest position between the guide shoes, wherein the guide shoes extend from the cylinder beyond an end of the central support opposite from the handle end and terminate at a second end opposite the first end to define a guide slot therebetween;

positioning the pivoting tool to an access configuration with a handle extending from the cross-member of the head, the handle having an elbow defining an offset angle in a plane substantially perpendicular to the pivoting plane;

guiding a wall of the structure into the guide slot to position the opposite end of the central support into engagement with the locking element; and exerting a lever effect with the central support on the locking element by way of a control bearing on the structure coupled to the central support and engaged with the locking element to pivot the central support from the initial rest position in the guide slot to an operative position out of the guide slot for manipulating the locking element.

10. The method of claim 9, wherein the element comprises a Body Landing Gear (BLG) hook, and wherein exerting a lever effect comprises exerting the lever effect on the BLG hook utilizing the pivoting tool to cause the BLG hook to pivot into a closed position.

11. The method of claim 9, further comprising telescopically adjusting a length of the handle to adapt to the access configuration at given distance.

* * * * *